Oct. 27, 1953  J. BOYCE ET AL  2,656,911
CONTAINER FEED AND DISCHARGE MECHANISM
Filed March 8, 1948  7 Sheets-Sheet 1

INVENTORS
JOHN BOYCE
JOHN C. OLSEN
BY Philip P. Minnis
Hans G. Hoffmeister
ATTORNEYS Oct. 27, 1953     J. BOYCE ET AL     2,656,911
CONTAINER FEED AND DISCHARGE MECHANISM
Filed March 8, 1948     7 Sheets-Sheet 2
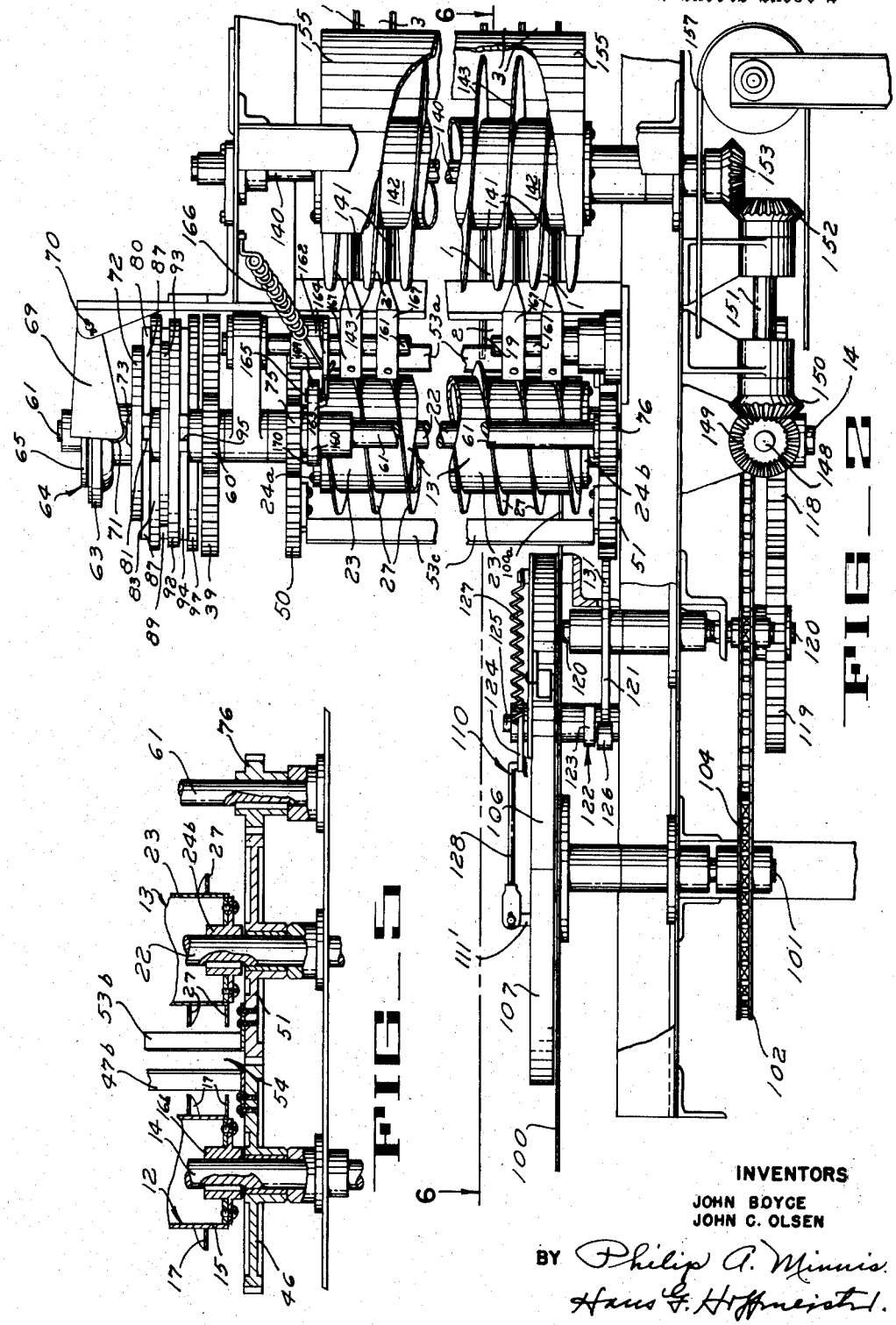
INVENTORS
JOHN BOYCE
JOHN C. OLSEN
ATTORNEYS

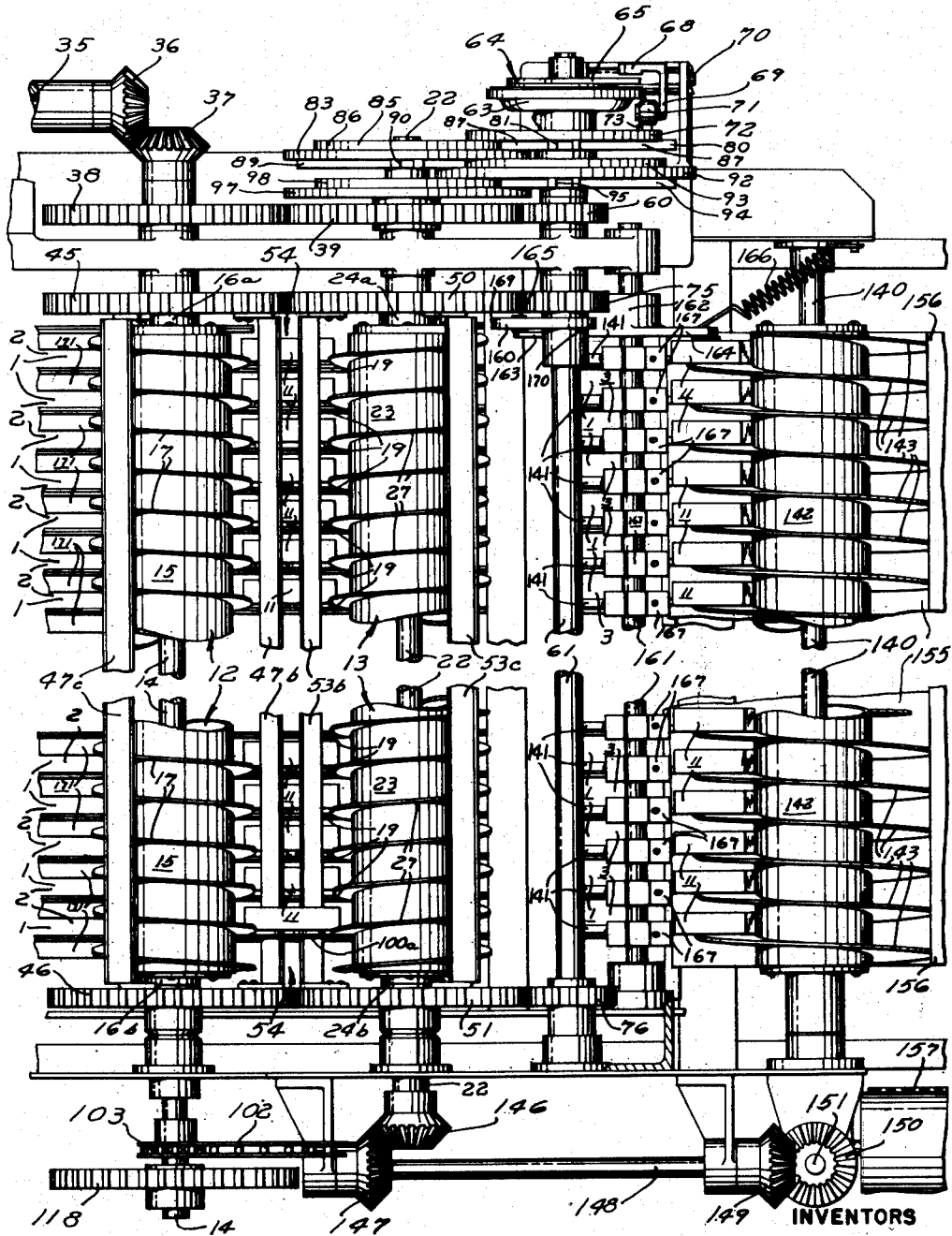

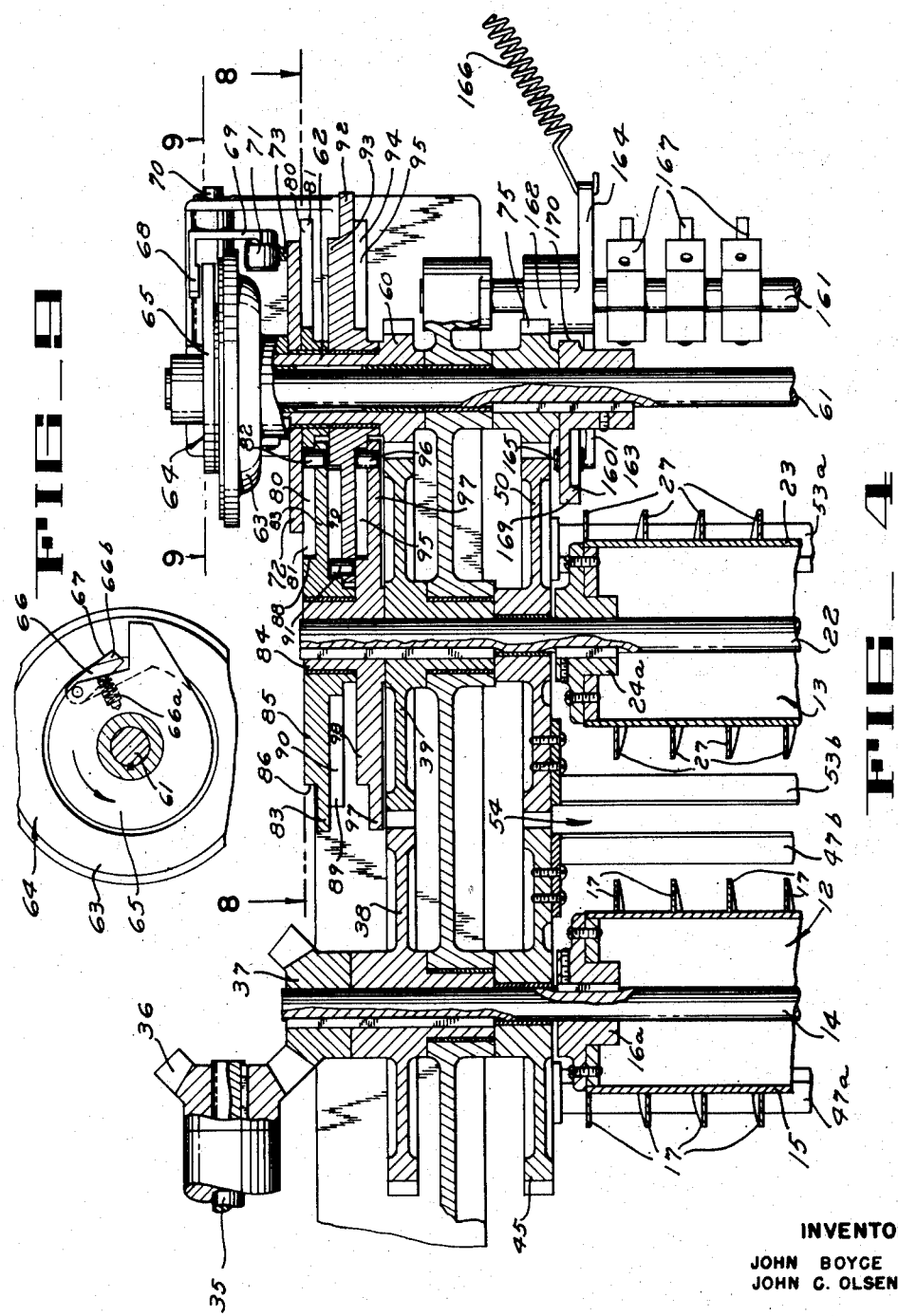

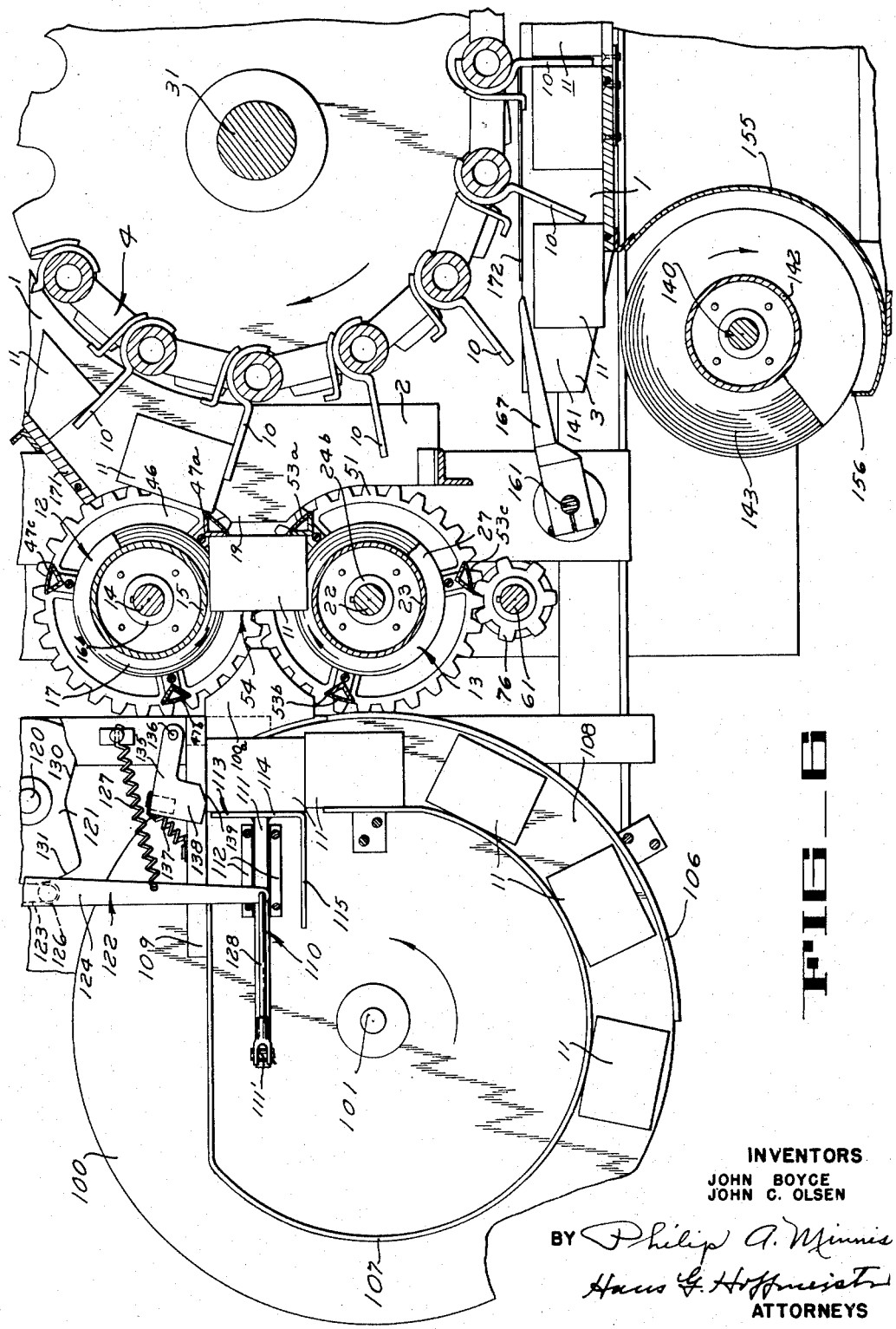

Oct. 27, 1953  J. BOYCE ET AL  2,656,911
CONTAINER FEED AND DISCHARGE MECHANISM
Filed March 8, 1948  7 Sheets-Sheet 6

INVENTORS
JOHN BOYCE
JOHN C. OLSEN
BY Philip A. Minnis
Hans G. Hoffmeister
ATTORNEYS

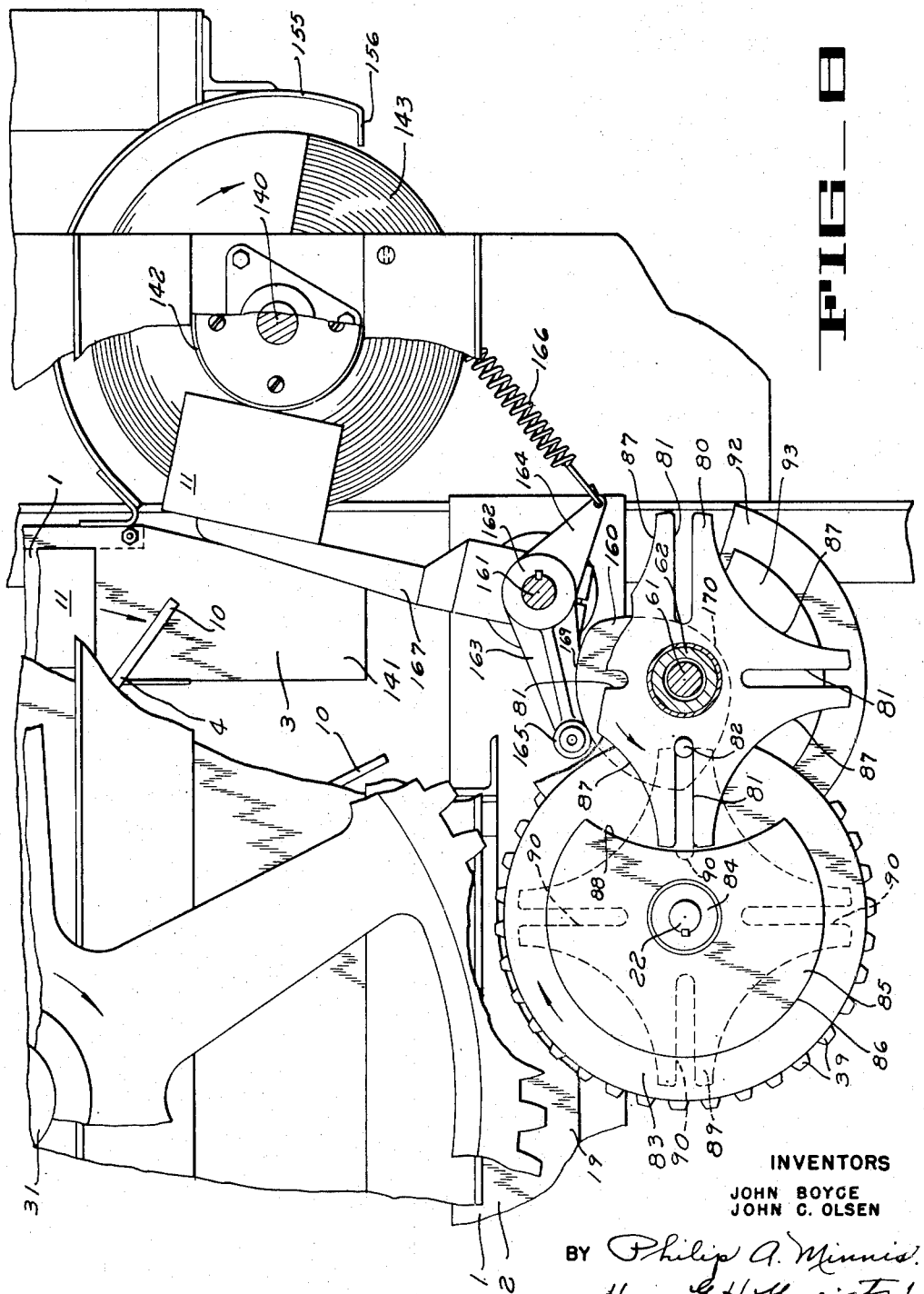

Patented Oct. 27, 1953

2,656,911

UNITED STATES PATENT OFFICE 2,656,911

CONTAINER FEED AND DISCHARGE MECHANISM

John Boyce, San Jose, and John C. Olsen, Campbell, Calif., assignors to Food Machinery and Chemical Corporation, a corporation of Delaware Application March 8, 1948, Serial No. 13,696

20 Claims. (Cl. 198—31)

1

The present invention relates to feed mechanisms for container handling machines of the type employed in food processing establishments. In establishments of this kind, containers, such as cans, cartons, packages, and the like, are usually transported from machine to machine by chutes or conveyor belts and approach, and are processed by, the machines in single file processions. Certain types of container handling machines, however, may be constructed to handle a plurality of container processions simultaneously. This presents the problem of properly distributing the successively arriving containers to the various feed openings of the machine, and since the coordinated processing lanes of such machines may be arranged to operate in phase alignment, it may be necessary that the distributed containers, although arriving on the single file supply line in succession, must be fed into the various feed openings of the machine at precisely the same time.

It is, therefore, one object of the present invention to provide mechanism for delivering individual containers simultaneously into the feed openings of a multiple lane container handling machine.

Another object is to provide mechanism adapted to transfer containers from a single file supply line to the various feed openings of a multiple lane container handling machine.

Another object is to provide mechanism arranged to convert a single file of containers into a plurality of parallel branch lines and adapted to advance the containers of said branch lines in aligned relation relative to one another.

Another object is to provide mechanism adapted to supply containers to the various feed openings of a multiple lane container handling machine from a single file container supply line.

A further object is to provide a feed mechanism of the type referred to, which is adapted to supply containers to the various feed openings of a multiple lane container handling machine in synchronized relation.

Another object is to provide feed mechanism adapted to transfer containers from a single file line into the feed openings of a container handling machine of the type wherein the individual processing lanes are vertically superposed.

Another object is to provide a feed mechanism of the type referred to, which is adapted to deliver containers individually and in vertical alignment with one another into the superposed feed openings of a multiple lane container processing machine.

2

Another object is to provide a discharge mechanism for multiple lane container handling machines which is adapted to rearrange the containers simultaneously emerging from the multiple discharge openings of the machine into a single file.

These and other objects and advantages of the present invention will become apparent from the following description and drawings in which:

Fig. 2 is a fragmentary side elevation of the same mechanism viewed in the direction of the arrows 2—2 of Fig. 1.

Fig. 3 is a fragmentary front elevation of the same mechanism viewed in the direction of the arrows 3—3 of Fig. 1.

Fig. 4 is a vertical cross section through the top portion of the mechanism illustrated in Fig. 1 and taken along line 4—4 thereof.

Fig. 5 is a vertical cross section, corresponding to Fig. 4, through the lower portion of the mechanism illustrated in the preceding figures.

Fig. 6 is a horizontal section through the mechanism of the present invention taken along line 6—6 of Fig. 2 and showing part of a continuous process freezer with which said mechanism is associated to illustrate its manner of application.

Fig. 8 is another horizontal cross section through part of the mechanism taken along line 8—8 of Fig. 4.

Fig. 9 is a section of a portion of Fig. 4 taken along line 9—9 thereof.

Figure 1:
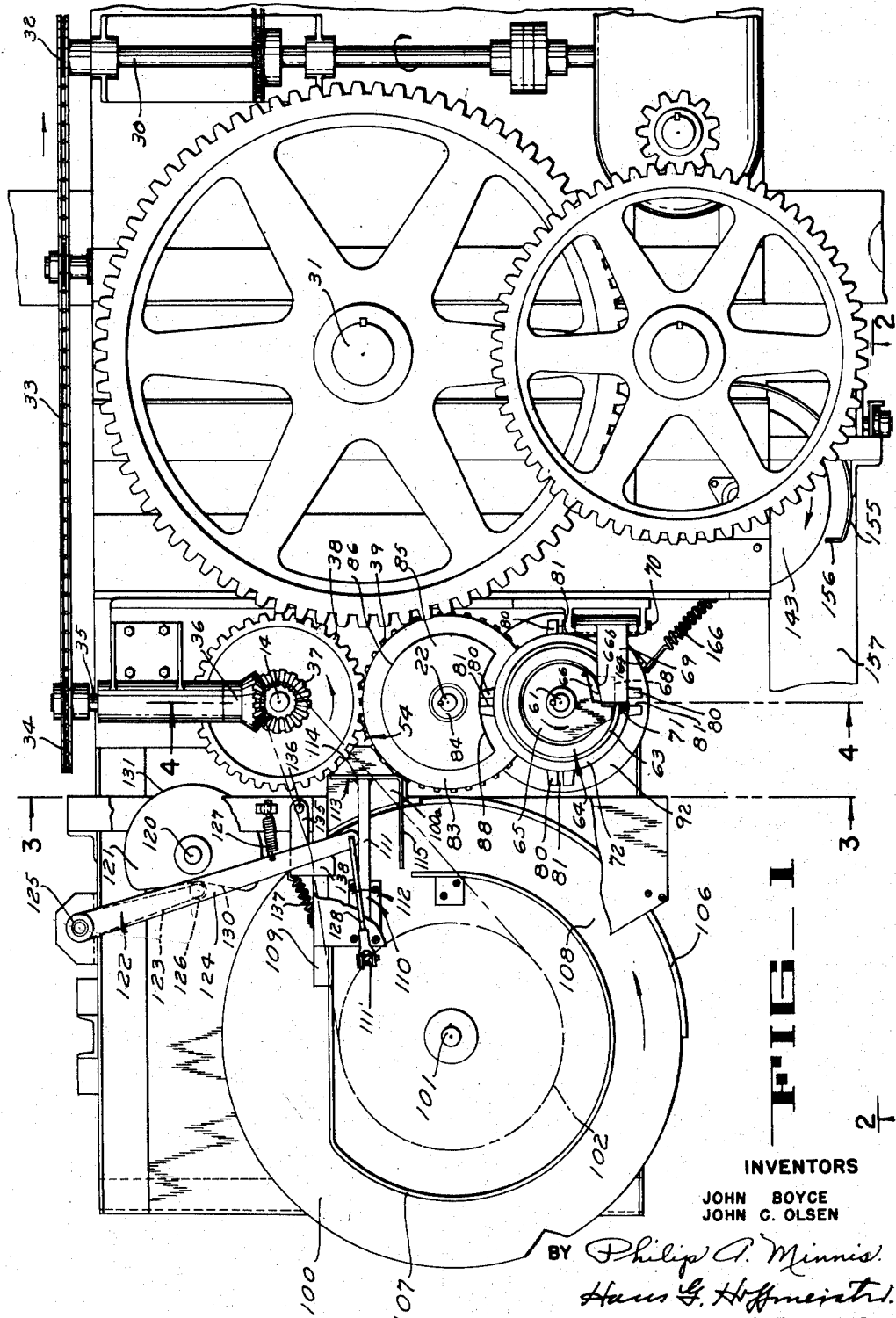
Fig. 1 is a plan view of a feed mechanism constructed in accordance with the present invention.

In the accompanying drawings the feed mechanism of the present invention has been illustrated in connection with a continuous process freezer illustrated and described in a copending application Serial No. 10,286 of John C. Olsen and Theodore A. Dungan for Freezing Apparatus filed December 1947 now Patent No. 2,629,233. Freezing apparatus of this type are formed by a plurality of superposed freezing compartments through which packages of edibles are moved in sliding contact with as many surfaces of the freezing compartment as is possible. In the particular freezing apparatus disclosed in the above mentioned patent application each of the superposed freezing compartments I extends somewhat in the manner of a hair-pin with its opposite open ends 2 and 3 positioned adjacent to one another; and for moving a continuous procession of food packages through each of said compartments from open end to open end an endless conveyor mechanism 4 extending around vertical axes is arranged within the enclosure formed by said superposed compartments. The inner flanks of each of these compartments are open to receive outwardly projecting pusher arms 10 (Figs. 6 and 7) carried by said endless conveyor mechanism 4 in as many vertically superposed horizontal rows as there are compartments in the freezing apparatus. These arms engage behind packages 11 fed into the freezer and slide them along said compartments from end to end thereof.

In order that freezers of the type briefly described above may be operated at full capacity each of the superposed compartments must be successively supplied with individual food packages at precise intervals determined by the speed with which successive ones of said conveyor arms 10 move into position before the feed openings of said compartments and, as the conveyor arms in different horizontal rows are preferably vertically aligned, as many food packages 11 as there are superposed compartments must simultaneously be moved within the range of the conveyor arms, whenever a vertical column of said arms moves into position before the feed openings of the compartments. Since, in food packing establishments, the containers to be processed are usually transported from machine to machine in single file chutes or conveyor lines, freezers of the type characterized present a typical example for machinery which requires conversion of a single file supply line of successively arriving containers into a multiple feed line adapted to simultaneously deliver individual packages at precise intervals into a plurality of separate feed openings.

The feed mechanism of the present invention comprises a pair of vertically positioned worm or screw elevators 12 and 13, respectively, as best seen on Fig. 3. The conveyor 12 on the left side comprises a vertical shaft 14 rotatably supported in the machine frame in any suitable manner and a cylindrical tube 15 surrounding said shaft and firmly mounted thereon for rotation therewith by means of an upper and a lower hub 16a and 16b, respectively (Figs. 4 and 5), both of which are keyed to the shaft 14 as shown. The cylindrical tube 15 is provided with a continuous helical rib 17 ascending along its outer surface from the bottom to the top at a pitch corresponding to the height of the superposed freezing compartments, the feed ramps 19 of which may be seen behind the elevators 12 and 13 in Fig. 3.

Also, the second worm elevator 13 comprises a vertical shaft 22, rotatably supported in the machine frame, and a cylindrical tube 23 firmly mounted upon upper and lower hubs 24a and 24b, respectively, both of which are keyed to said shaft 22, as shown in Figs. 4 and 5. The tube 23 carries a continuous helical rib 27 which ascends along its outer surface from the bottom to the top at a pitch identical to the pitch of the helical rib 17, but whereas the latter ascends its tube 15 in clockwise direction, as viewed from the top, the helical rib 27 of tube 23 rises in counterclockwise direction as clearly shown in Fig. 3.

When the conveyor mechanism is in operation, the described worm elevators are arranged to turn continuously at identical speed but in opposite directions with their inner confronting segments moving toward the feed ramps 19 of the freezing compartments. Having specific reference to Figs. 6 and 7 this means that the elevator 12 turns constantly in counterclockwise direction whereas the elevator 13 turns constantly in clockwise direction. In addition, the rotary position of the two worm elevators is initially adjusted in such a maner that the confronting edges of their oppositely ascending helical ribs 17 and 27 are horizontally aligned (Fig. 3) and since the elevators are turned in opposite directions at identical speeds, the inner segments of their ribs will remain at identical levels throughout the operation of the mechanism.

As the operation of the feed mechanism of the invention and the advance of the endless conveyor in the freezing apparatus must occur in timed relation, as previously explained, both the feeding mechanism and the conveyor of the freezing aparatus are preferably driven from the same source of power. For this purpose a horizontal shaft 30 rotatably supported on top of the freezing apparatus as shown in Fig. 1 and driven from any suitable source of power, such as an electric motor (not shown), is coupled through a suitable train of timing gears to one of the vertical shafts 31 of the endless conveyor mechanism within the enclosure formed by the freezing compartments. In addition, the horizontal shaft 30 carries a sprocket 32 firmly mounted thereon, which is operatively connected by means of a sprocket chain 33, with another sprocket 34 keyed upon a second horizontal shaft 35 that is rotatably supported from the machine frame (Fig. 1). Likewise keyed upon said horizontal shaft 35 is a bevel gear 36 which meshes with another bevel gear 37 that is keyed upon the upper end of the elevator shaft 14.

Directly below the bevel gear 37 a spur gear 38 is keyed to the shaft 14. This spur gear 38 is arranged to mesh with another spur gear 39 of identical diameter which is keyed to the shaft 22 of the worm elevator 13 on the right side of the mechanism.

Thus, whenever the first mentioned horizontal shaft 30 is driven in clockwise direction, as viewed in Fig. 1, the shaft 14 of the left hand elevator 12 and, hence, the elevator 12 itself are driven in counterclockwise direction while the shaft 22 of the right hand elevator 13 and, hence, the elevator 13 itself are driven in clockwise direction, as viewed in Fig. 1.

Loosely mounted upon the shaft 14 of the worm elevator 12 directly above and below the hubs 16a and 16b, respectively, are two spur gears 45 and 46, the pitch circles of which have diameters equal to the distance between the center axes of the two adjacently positioned worm elevators 12 and 13 (Figs. 4 and 5). Rigidly supported by and between these gears are three vertical bars 47a, 47b, and 47c spaced 120 degrees apart, as may best be seen from Figs. 6 and 7. These bars have preferably the cross section of right angled triangles with the right angled peaks of the triangles arranged to point radially toward the center axis of the elevator 12 and the hypotenuses curved to conform with the circle along which they are arranged and which is only slightly less than the pitch circle of the gears.

The spur gears 45 and 46 each mesh with an identical spur gear 50 and 51, respectively, loosely mounted upon the shaft 22 of the adjacent worm elevator 13 directly above and below the hubs 24a and 24b of the cylindrical tube 23 as shown in Figs. 3 and 4. Between their confronting faces the gears 50 and 51 rigidly support three angularly spaced vertical bars 53a, 53b, and 53c, which are of the same disposition and construction as the bars 47a, 47b, and 47c associated with the left hand worm elevator 12.

While the two adjacent worm elevators 12 and 13 turn continuously as long as the feed mechanism is in operation, the gears supporting the bars 47 and 53 remain stationary during most of the time and turn over an arc of only 120° in the direction of movement of their associated worm elevators, whenever the latter have completed as many revolutions as there are superposed freezing compartments which have to be supplied with packages.

Whenever the gears 45, 46, and 50, 51 are at rest, their bars 47 and 53, respectively, are in the angular positions illustrated in Fig. 6 wherein one bar of each set (for instance 47a and 53a) is positioned approximately 45° beyond a plane determined by the center axes of the two elevators 12 and 13, in the direction of rotation thereof. In this position the rearward sides of the bars 47a and 53a (viewed in the direction of movement of the elevators) restrict the horizontal width of the gateway 54 formed by and between the confronting segments of the rotating tubes 15 and 23 (Fig. 3), and thus form a gate which positively obstructs further horizontal advance of any package fed into said gateway 54 at the bottom of the worm elevators 12 and 13 (Fig. 6).

However, since the helical ribs 17 and 27 upon which each such package rests continue to turn in directions opposite to their ascent, upwardly sloping surfaces glide progressively underneath the package elevating it in sliding contact with the rear surfaces of the bars 47a and 53a from compartment to compartment for every revolution of the worm elevators 12 and 13. Thus, a package procession arriving at the bottom of the described mechanism and fed into the gateway 54 formed between the rotating worm elevators is automatically converted into a steadily growing column of vertically superposed individual packages.

While the position of the gate bars 47a and 53a when the same are at rest has been characterized as 45° beyond the plane determined by the center axes of the worm elevators, it will be understood that this position is not critical and that the bars 47a and 53a may be placed at smaller or larger angles beyond said plane, the important point being that they are capable of barring packages from sliding through the gateway formed between the confronting elevator segments onto the feed ramps 19 of the freezing compartments.

However, as soon as the column of vertically superposed packages has reached an altitude equal to the number of the superposed freezer compartments, the gears 45, 46 and 50, 51 are automatically caused to turn 120° in the direction of movement of their associated worm elevators 12 and 13, respectively. As a result thereof, the gate established by the bars 47a and 53a is thrown open permitting the packages to slide through the gateway 54. At the same time, the next bars in succession, i. e., bars 47b and 53b are caused to move into the position formerly occupied by the bars 47a and 53a, to push the packages positively onto the feed ramps 19 and reestablish a new barrier along which a fresh column of packages may rise.

For this purpose, the gear 39 (Fig. 4) which drives the shaft of the worm elevator 13, meshes with another gear 60 of materially smaller diameter mounted loosely upon a vertical shaft 61 which is rotatably supported in the machine frame and is normally in stationary condition.

Integral with the gear 60 is a sleeve or bushing 62 upon which is rigidly mounted a clutch casing 63 which forms the driving member of a single revolution clutch 64 (Fig. 4). The driven member of the clutch 64 is a disc 65 arranged concentrically within the casing 63 (Figs. 1 and 9) and keyed upon the vertical shaft 61.

Since single revolution clutches are well known in the art, the structure and operation of clutch 64 will only be briefly described. Pivoted to the driven disc 65 is a pawl 66 urged by a suitable spring 66a to project radially beyond the periphery of the disc 65 so as to engage a suitable notch 67 in the inner wall of the rotating casing 63. Normally, however, the nose 68 of a clutch stop 69 (Figs. 2 and 4) engages a projection 66b of the pawl and restrains the pawl against the urgency of its spring 66a from engaging the clutch casing 63 and at the same time acts as a positive stop for the clutch disc 65.

In the particular embodiment of the invention illustrated in the accompanying drawing the clutch stop 69 has the form of an arm of roughly triangular shape (Fig. 2) with its nose 68 projecting laterally from one of its upper corners (Figs. 3 and 4) and its remote corner pivoted to the machine frame at 70 (Fig. 2) while its lowermost corner is provided with a roller 71 that rides on the upper face of a clutch control disc 72 (Figs. 3 and 4). This disc 72 is loosely mounted upon the sleeve 62 of the previously mentioned spur gear 60, as shown in Fig. 4, and is arranged to turn intermittently in timed relation with the rotation of the worm elevators 12 and 13, as will presently appear.

The upper face of the disc 72 is provided with a lobe or rise 73 of short duration (Figs. 2, 3, and 4) disposed in the path of said roller 71 and adapted to lift said stop 69 sufficiently high to lift its nose 68 out of engagement with the previously described projection 66b of the clutch pawl. As a result thereof, the head of said pawl 66 will drop into the notch 67 provided in the interior wall of the rotating casing 63 and thus establish driving connection between said casing and the disc 65 forcing shaft 61 to rotate in counterclockwise direction. However, by the time the disc 65 has made one complete revolution returning its spring pawl to its initial position opposite to the clutch stop 69, the roller 71 has negotiated the lobe 73 and the nose 68 of the stop has dropped back into its initial position. Therefore, it cams the spring pawl 66 out of engagement with the rotating casing 63 and positively blocks further movement of disc 65. Thus, rotation of the shaft 61 is limited to one revolution which occurs whenever the lobe 73 has described a full circle of 360°.

Keyed upon the shaft 61 are two small spur gears 75 and 76 (Figs. 4 and 5) which mesh with the spur gears 50 and 51 that are loosely mounted upon the drive shaft 22 of the worm elevator 13 above and below the cylindrical tube 23 thereof and which support the gate bars 53a, 53b, and 53c as previously described. Since the gears 50 and 51 mesh with the corresponding gears 45 and 46 of the adjacent worm elevator 12, each single revolution of the shaft 61 in counterclockwise direction as viewed in Fig. 1 will turn the gear pairs 50, 51 and 45, 46 in clockwise and counterclockwise direction, respectively, over an arc determined by the ratio of the gears 75, 76 relative to the gears 50, 51. In the illustrated embodiment this ratio is 1:3 in order to turn the gears 50, 51, and 45, 46 over an arc of 120° and thus cause the gate bars 47 and 53 to establish identical conditions upon every operational cycle of the single revolution clutch 64.

The frequency with which the described operation of the gate bars 47 and 53 is to occur, depends evidently on the number of the compartments that are to be serviced by the feed mechanism of the invention. For instance, assuming that the freezing apparatus comprises sixty-four superposed compartments, the described gate mechanism is to be actuated every time the worm elevators have completed sixty-four revolutions because a package delivered into the feed mechanism at the level of the lowest compartment with the first revolution of the elevators will have reached the level of the highest compartment upon completion of the sixty-fourth revolution. It is necessary, therefore, that the previously mentioned clutch-control disc 72 with its solitary lobe 73 be very accurately operated at a fraction of the angular speed of the elevators 12 and 13 determined by the number of compartments which are to be serviced. Reverting to the specific example illustrated and described, this means that the control disc 72 must be turned at one-sixty-fourth of the angular speed of the worm elevators 12 and 13.

To establish this relation the control disc 72 may be driven from the shaft 22 of the worm elevator 13 through a suitable Geneva system such as the one illustrated in the accompanying drawing. Having specific reference to Figs. 4 and 8, a four-pointed star wheel 80 loosely mounted upon sleeve 62 is rigidly attached to the bottom face of the clutch control plate 72. This star wheel has four radial slots 81 adapted to be successively engaged by a drive pin 82 mounted upon the edge of a circular drive disc 83 which turns loosely upon a sleeve 84 keyed to the top of the drive shaft 22 of the worm elevator 13.

The disc 83 carries the usual cam 85 of crescent shape, the circular circumference 86 of which is adapted to engage one of the arched flanks 87 of the star wheel 80 whenever the pin 82 disengages a slot 81 thereof, so as to maintain the star wheel 80 positively in a proper angular position for the circling pin 82 to enter the next one of its radial slots 81. As shown in Fig. 8, the contour of the cam 85 has an arcuate depression 88 which is of such size and location that the cam releases the star wheel 80 for further rotational advance at the very moment when the drive pin 82 enters one of the slots 81.

A second star wheel 89 of the same construction as the star wheel 80 is rigidly secured to the bottom face of the drive disc 83 (Figs. 4 and 8) and has four radial slots 90 which are successively engaged by the drive pin 91 of a second drive disc 92 loosely mounted upon the sleeve 62 below the star wheel 80. The disc 92 carries the usual locking cam 93 upon its upper face and has a third star wheel 94 secured to its lower face, the four radial slots 95 of which are successively engaged by the drive pin 96 of a third drive disc 97. The drive disc 97 is keyed to the drive shaft 22 of the worm elevator 13 and is integral with the previously mentioned sleeve 84, as shown in Fig. 4, and it carries the usual locking cam 98 upon its upper face.

In operation, the drive disc 97 is constantly turned by the elevator shaft 22 and drives the star wheel 94 and the disc 92 thereof over only one quadrant for every complete revolution of the worm elevator 13. The drive disc 92 drives, in turn, the star wheel 89 and its disc 83 over one quadrant for every complete revolution of its own, that is to say, sixteen complete revolutions of the worm elevator 13 are required before the star wheel 89 and the drive disc 83 make one complete revolution, and one such complete revolution of the drive disc 83 advances the star wheel 80 and, hence, the clutch control disc 72 over only a single quadrant. Therefore, it requires sixty-four complete revolutions of the worm elevator 13 before the disc 72 makes a complete 360° turn. This means that the solitary lobe 73 on the upper face of the clutch control disc 72 actuates the clutch stop 69 of the described single revolution clutch 64 only once for every sixty-four revolutions of the worm elevators and, hence, packages fed into the gateway 54 formed by the rotating elevator tubes may rise to a sixty-four-storied column before the gate mechanism 47, 53 acts to deliver them onto the superposed feed ramps 19 of the freezing compartments.

It will be understood that the position of the lobe 73 on the clutch control disc 72 must be carefully predetermined in relation to the operation of the worm elevators to be sure that the inner confronting segments of the helical ribs 17 and 27 on the rotating cylinders 16 and 23, respectively, be at about the same level (or slightly above the level) of the feed ramps 19 whenever the gate bars 47, 53 effect the transfer of the column of vertically accumulated packages onto the feed ramps 19 and into the range of the pusher arms 10 of the conveyor mechanisms in the interior of the freezing apparatus. It will also be understood that the operation of both, the gate mechanism and the worm elevators, must, in turn, be carefully related to the operation of the conveyor mechanism in the interior of the freezing apparatus so that the package transfer from the elevators onto the feed ramps 19 of the freezer occurs at a time when said feed ramps have been completely cleared from any packages that may have been deposited there by a previous cycle in the operation of the feed mechanism, and just before a new column of pusher arms 10 approaches the space onto which the packages are delivered.

Furthermore, it will be understood that the described Geneva transmission is only one of many ways, that may occur to those skilled in the art, for properly timing the operation of the gate mechanism 47, 53 with the operation of the worm elevators 12 and 13 according to the number of superposed feed openings to be serviced by the feed mechanism of our invention. Thus, electrical timing mechanisms of well known construction may be used to engage the single revolution clutch 64 at the proper time intervals, and the power to turn the gate bars need not necessarily be derived from one of the drive shafts of the worm elevators, but may be taken off at some other suitable point of the power train and may even be delivered from an independent source of power.

As previously pointed out, the transportation of containers from machine to machine is usually effected by chutes or endless conveyor belts in single file lines in which successive containers may, at times, be in abutting relation or may be spaced varying distances apart. The described feed mechanism, however, requires that the containers arrive in intervals corresponding to one full revolution of the worm elevators, or multiples thereof, so that they may glide smoothly onto the upper faces of the lowermost rib convolutions instead of striking against the rotating edges thereof which might cause them to be damaged.

It is, therefore, necessary that the transfer of the containers from the supply line to the feed mechanism be properly controlled, and for this purpose a rotating circular table 100 is arranged in front of the worm elevators 12 and 13 somewhat to the right of the gateway 54 (Figs. 6 and 7) with its upper surface preferably at a level slightly above the bottom ends of the elevator cylinders, as best shown in Fig. 2. The table 100 is firmly mounted upon a short vertical shaft 101 which is rotatably supported in the base of the machine frame and turns in counterclockwise direction, as viewed in Figs. 1, 6, and 7. The shaft 101 is driven from the drive shaft 14 of the worm elevator 12 by means of a sprocket chain 102 (Fig. 2, and indicated in broken lines in Fig. 1) which is trained around a small sprocket 103 keyed to the lower end of the shaft 14 (Fig. 3) and a large sprocket 104 keyed to the lower end of said shaft 101 (Fig. 2).

Figure 7:
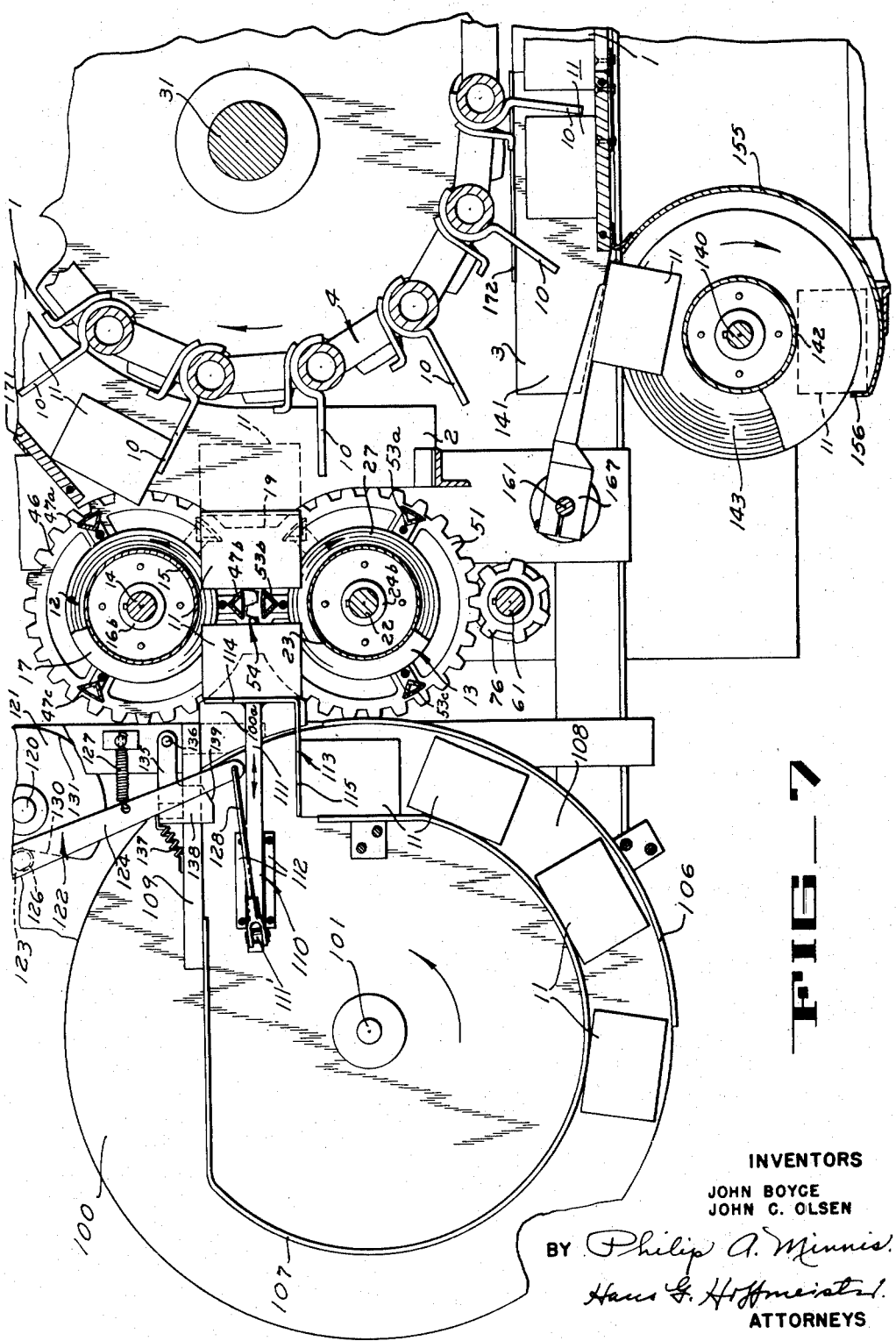
Fig. 7 is a horizontal section through the mechanism of the invention similar to Fig. 6, but illustrating a different operational stage thereof.

Rigidly supported from the machine frame slightly above the level of the rotating table 100 is a pair of guide rails 106 and 107, respectively, which are arranged to form a corridor or runway 108 extending along part of the table's edge in the direction of rotation thereof and terminating laterally of the gateway 54, as shown in Figs. 1, 6, and 7. The outer rail 106 is preferably shorter than the inner rail 107, as shown, to facilitate delivery of the packages 11 from a supply belt (not shown) onto the table 100 and into the arcuate runway 108.

Disposed transversely across the end of the runway 108 and spaced from the ends of the guide rails 106 and 107 by a distance slightly larger than the length of the packages 11 is a stationary stop ramp 109 which is supported from the machine frame and which may be extended beyond the edge of the rotating table 100 to a point close to the range of the revolving helical rib 17 of the worm elevator 12. Disposed adjacent the stop ramp 109 and intermediate the table 100 and the worm elevators 12 and 13 is a shelf 100a. This shelf is fixed to the machine frame in any convenient manner so that its surface forms a continuation of the table 100. Arranged for movement along said stop ramp 109 and over a portion of the table 100 and shelf 100a is a package injector mechanism 110 which comprises a piston rod 111 slidably mounted within suitable guide means 112 (Figs. 1, 6, and 7). Mounted upon the forward end of said piston rod 111 is a pusher head 113 formed by a rectangular plate which presents a vertical face 114 to the gateway 54 and which is preferably of a width less than the length of the packages 11. On the side of the guide rails 106 and 107 the pusher head 113 possesses a lateral lip 115 which projects rearwardly from its frontal face 114, as shown, and is of sufficient length to effectively close the end of runway 108.

During operation of the feed mechanism the pusher head 113 is lineally reciprocated from an extreme backward position, in which its lip 115 clears the end of the runway 108, as illustrated in Fig. 6, to an extreme forward position in which its frontal surface 114 approaches the edges of the helical ribs 17 and 27 of the worm elevators, as shown in Figs. 1 and 7.

For this purpose, a gear 118 is keyed to the bottom of the elevator drive shaft 14 (Fig. 3) and meshes with another gear 119 of identical size (Fig. 2) which is keyed to a vertical shaft 120 rotatably supported in the machine frame in any suitable manner. The shaft 120 carries a cam 121 firmly mounted thereon for rotation therewith, as shown in Figs. 1 and 2. Operatively associated with the cam 121 is a cam follower lever 122 which comprises a short lower arm 123 and a long upper arm 124 rigidly connected with one another by a gudgeon 125 that is journalled in the machine frame to the left of the worm elevator 12, as shown in Fig. 1. The free end of the short arm 123 is provided with a roller 126 (Fig. 6) urged into engagement with the edge of the cam 121 by means of a strong coil spring 127 disposed between the machine frame and the upper arm 124 of the cam follower lever. The free end of the upper lever 124 is pivoted to one end of a link 128, the opposite end of which is jointed to an upwardly projecting pin 111' rotatably mounted on the rear end of the previously described piston rod 111.

The cam 121 has a solitary depression 130 which occupies roughly one-third of its circumference, with the remaining two-thirds forming a circular arc 131, as best shown in Fig. 1.

As long as the roller 126 rides on the circular arc 131, the cam 121 keeps the spring 127 under tension and maintains the pusher head 113 of the package injector mechanism 110 in a position in which it is completely withdrawn from the space formed between the end of the guide rails 106, 107, and the stop ramp 109. Whenever the pusher head 113 is positioned in this manner, a package deposited on the rotating table 100 between the guide rails 106 and 107 is carried through the runway 108 and comes to rest against the stop ramp 109 directly before the frontal surface 114 of the pusher head 113, as shown in Fig. 6.

As soon as the roller 126 drops into the depression 130, however, the force of the tensioned spring 127 pulls the arm 124 of the cam follower 122 in counterclockwise direction, as viewed in Figs. 6 and 7, causing the pusher head 113 to advance rapidly into the position illustrated in Fig. 7 in which it shifts the package 11 along shelf 100a onto the revolving ribs 17 and 27 of the cooperating worm elevators. As the cam 121 continues to revolve and the roller 126 climbs back to the level of the arc 131, the arm 124 of the cam follower is forced backwards in clockwise direction, as viewed in Figs. 6 and 7, reconditioning the spring 127 for a new cycle in the operation of the mechanism and returning the pusher head 113 to its original location illustrated in Fig. 6, in which a new package 11 may slide against the stop ramp 109 and position itself in front of the surface 114. It should be noted, that during the operative phase of the described package injector mechanism 110 interference by a package pressing closely behind the ejected package is positively prevented by the lateral lip 115 of the pusher head 113 which effectively bars the forward end of the runway 108 as long as the pusher head is in a projected position. It will be understood that the operation of the cam 121 must be carefully timed with the operation of the worm elevators 12 and 13 lest the packages be thrown against the edges of the elevator ribs, instead of sliding upon the upper surfaces thereof, and since the preferred embodiment as illustrated in the accompanying drawings and described above is arranged in such a manner that the cam 121 rotates at the same angular speed as the worm elevator 12 due to the identity in the construction of the gears 118 and 119, it is the angular position of the cam depression 130 which must be properly related to the vertical position of the confronting segments of the helical ribs, in order that the packages be delivered smoothly into the gateway 54.

Whenever the packages on the supply line are spaced very irregularly, it may happen that a package 11 does not have sufficient time to reach the stop ramp 109 and place itself fully in front of the pusher head 113, before the package injector mechanism strikes forward toward the gateway 54 in the manner previously described. In such a case, the package would be crushed between the frontal surface 114 of the pusher head 113 and the end of the outer guide rail 106.

To avoid accidents, such as damage to the cartons, means are provided to arrest the injector mechanism 110 in retracted condition, no matter what the angular position of the control cam 121 may be, as long as there is no package positioned fully in front of the pusher head 113. For this purpose a latch 135 is pivoted to the machine frame at 136 on the same side of the injector mechanism as the stop ramp 109, as shown in Figs. 1, 6, and 7, and a relatively weak spring 137 is arranged to urge the nose 138 of the latch 135 laterally into the path of the pusher head 113 at a point directly above the stop ramp 109 and in line with the end of the inner guide rail 107, as shown in Figs. 1 and 7 and as indicated in dotted lines in Fig. 6. Whenever the latch 135 is in this position in front of the pusher head 113, the injector mechanism 110 is unable to follow the force of the spring 127, no matter what the momentary position of the control cam 131 may be and the pusher head 113 may at best idly reciprocate against the nose of said latch without being able to enter the space in front of the package runway 108.

However, as soon as a package 11 moves all the way across the space in front of the pusher head 113 and strikes against the projecting nose of the latch 135, said latch will yield laterally out of the path of the pusher head 113, as shown in Fig. 6, permitting the injector mechanism 110 to make a full forward stroke as soon as the roller 126 drops into the depression 130 of the continuously moving control cam 121. It should be noted from the drawings that while the inner or latching corner of the latch nose 138 is rectangular, its outer corner is beveled, as shown at 139, so that the pusher head 113 may readily cam the latch out of its path of movement during the return stroke of the injector mechanism and reposition itself behind its nose 138 until a newly arriving package pushes the latch again out of the path of said pusher head. Thus, damage to the packages, such as may be caused by their untimely arrival in the space before the pusher head, is effectively prevented.

All of the mechanisms so far described serve to convert a single file supply line of irregularly spaced containers into a vertically aligned stack and deliver the individual containers of said stack simultaneously and at the proper time onto the superposed feed ramps 19 for engagement by the pusher arms 10 of the conveyor mechanism operating in the interior of the freezing apparatus. In order that the described mechanisms may be employed in practice, it is evidently necessary that additional mechanism be devised to collect the many superposed containers as they emerge from the ends of the freezing compartments and deliver them in regular succession onto a common discharge chute or conveyor belt for transportation to whatever their next processing station may be.

For this purpose, a vertical shaft 140 is journalled in the machine frame laterally adjacent of the discharge ramps 141 of the superposed freezing compartments (Figs. 6 and 7). A cylindrical tube 142, similar in size and dispostion to the tubes 15 and 23 of the worm elevators 12 and 14, respectively, is firmly mounted upon the shaft 140, as shown in Fig. 2. The cylindrical tube 142 is provided with a continuous helical rib 143 which ascends its outer surface in clockwise direction, as viewed from the top, in at least as many convolutions as there are superposed freezing compartments, with the pitch of each convolution equal to the vertical distance between each two superposed discharge ramps 141.

The radial width of the helical rib 143 is materially greater than that of the elevator ribs 17 or 27 and its edge extends close to the outer edges of the discharge ramps 141 which are preferably beveled, as may best be seen from Fig. 6. During operation of the previously described organization of mechanisms, the cylindrical tube 142 with its helical rib 143 is constantly turned in clockwise direction, as viewed from the top, at an identical angular speed as the elevator tubes 15 and 23. For this purpose, a bevel gear 146 is keyed to the bottom of the drive shaft 22 of the worm elevator 13 and meshes with another bevel gear 147, of identical size, which is keyed to one end of a horizontal shaft 148 rotatably supported from the bottom of the machine frame in any suitable manner, such as shown in Fig. 3. A third bevel gear 149 is keyed to the opposite end of the shaft 148 and meshes with a fourth bevel gear 150, of identical size, which is keyed to one end of another horizontal shaft 151 disposed at right angles to shaft 148 and, likewise, supported from the machine frame, as shown in Fig. 2. A fifth bevel gear 152 is firmly mounted upon the opposite end of the shaft 151 and meshes with a sixth bevel gear 153, of identical size, which is keyed to the lower end of the vertical shaft 140 that carries the cylindrical tube 142.

Disposed around part of the cylinder 142 is an arcuate guard or fender 155 extending from a point adjacent to the outer edges of the discharge ramps 141 to a point approximately diametrically opposite thereof, as shown in Figs. 6 and 7. This fender is spaced radially from the edge of the helical rib 143 a sufficient distance to accommodate a package between its inner surface and the outer surface of the revolving cylinder 142, and its forward end is bent inwards to form a lip or flange 156 reaching close to the edge of the helical rib 143, as shown in Fig. 7.

Whenever a package 11 is pushed from one of the feed ramps onto the upper face of the revolving helical rib 143, it is carried in clockwise direction through the space between the cylinder 142 and the guard 155 until it comes to rest against the stop lip 156, as indicated in broken lines in Fig. 7. As the helical rib 143 continues to revolve in clockwise direction progressively lower portions of its slope glide constantly underneath the arrested package causing it to slide downwards along the inner surface of the stop lip 156 until it drops from the bottom end of the rib 143 onto a suitable conveyor belt 157, such as the one shown in Figs. 2 and 3.

For proper operation of the described package lowering mechanism it is necessary that all the packages delivered onto the discharge ramps 141 of the superposed freezing compartments be transferred onto the helical rib 143 at the same time and at an instant when the inner segments of said rib are at the same, or a slightly lower level, than the upper faces of the discharge ramps. Moreover, the transfer must occur at such intervals as will enble the described package lowering mechanism to work a package, that may have been delivered to its uppermost convolution, all the way down to its bottom end. Having specific reference to the exemplary embodiment illustrated in the accompanying drawings which is adapted to service sixty-four superposed freezing compartments, this means that mechanism must be provided which pushes the packages from the discharge ramps 141 onto the helical rib 143 once every sixty-four revolutions thereof.

For this purpose a cam 160 is keyed upon the previously described single revolution shaft 61, as best shown in Figs. 4 and 8, and keyed upon another vertical shaft 161, suitably journalled in the machine frame, as shown in Figs. 2 and 8, is a cam follower 162 comprising two opposite arms 163 and 164, respectively. The arm 163 is provided with a roller 165 which is held against the periphery of the cam 160 by a strong coil spring 166 tensioned between the opposite arm 164 and a suitable point of the machine frame (Fig. 8). Firmly mounted upon the shaft 161 are a plurality of vertically spaced transfer or ejector arms 167, one for each compartment of the freezing apparatus, which extend over the terminal edges of the feed ramps 141.

The cam 160 has a single lobe 169 extending over a circular arc of roughly 120° at full altitude and descending at either of its sides symmetrically to the lowest point 170 of the cam periphery, as shown in Fig. 8.

As long as the single revolution shaft 61 is at rest, the cam 160 presents its lowest point 170 to the roller 165 placing the transfer arms 167 into a position in which they extend along, and at a slight incline relative to, the inner edges of their associated feed ramps, as shown in Fig. 6. However, whenever the single revolution clutch 64 is engaged in the manner previously described as the worm elevators complete their sixty-fourth revolution, the shaft 61 makes a complete turn rotating the cam 160 in counterclockwise direction as viewed in Fig. 8. As a result thereof, the roller 165 is compelled to climb the lobe 169 causing the cam follower 162 and its shaft 161 to rock in clockwise direction against the force of the spring 166. This swings the arms 167 from the position shown in Fig. 6 into the positions illustrated in Figs. 7 and 8 causing them to push any packages lying on the ramps 141 onto the upper surfaces of adjacent segments of the helical rib 143, to be carried in clockwise direction against the stop lip 156, as previously described. As the cam 160 completes its revolution, the roller 165 drops from the lobe 169 enabling the spring 166 to restore the transfer arms 167 to their original position, as illustrated in Fig. 6.

It will be understood that the transfer or ejector arms 167 of the described lowering mechanism must be positioned at different altitudes than the respective pusher arms 10 of the conveyor mechanism in the interior of the freezing apparatus, so that there can be no interference between the operation of said two types of arms. Also, the lowering mechanism must be placed sufficiently far ahead of the discharge ends of the freezing compartments so as to be sure that the packages 11 have fully emerged from said compartments before they are acted upon by the transfer arms 167.

In practical operation, the conveyor mechanism in the interior of the freezing apparatus, the worm elevators 12 and 13, the rotary supply table 100, the control cam 121 of the package injector mechanism 110, and the package lowering mechanism all are set into continuous motion by applying power to the horizontal shaft 30 on top of the freezing apparatus (Fig. 1). A procession of packages, such as cartons of peas, ice cream, etc. is then conducted into the corridor or runway 108 formed between the guide rails 106 and 107 above the rotating table 100 which carries the packages individually against the stop ramp 109 in front of the pusher head 113 of the package injector mechanism 110. Although the control cam 121 of the package injector mechanism 110 is in continuous motion, as previously indicated, the mechanism is unable to strike forward until the leading face of a package is properly positioned again at the stop ramp 109 and forces the nose 136 of the latch 135 out of the path of the pusher head 113. However, whenever the latch 135 is properly forced backwards against the urgency of its restore spring 137 indicating that a package is properly positioned in front of the gateway 54, the depression 130 of the rotating control cam 121 will cause a powerful forward thrust of the pusher head 113 at the very moment when the confronting segments of the helical ribs 17 and 27 at the bottom of the revolving worm elevators 12 and 13 are horizontally aligned with the upper surface of the rotating supply table 100. Hence, the package is safely delivered upon the upper surfaces of said segments and into the gateway 54 formed by and between the revolving elevator cylinders 15 and 23.

The thrust of the pusher head 113 and the inward movement of the worm elevators 12 and 13 carry the package into the gateway 54 until it strikes against the barrier formed by the gate bars 47 and 53 in front of the feed ramps 19. When thus prevented from further advance in a horizontal plane, continued revolution of the helical ribs, upon which the package is supported, causes said package to rise vertically in sliding contact with the gate bars 47 and 53 in a manner previously described; and by the time the control cam 121 permits the injector mechanism to deliver another package into the gateway 54 at the bottom of the worm elevators 12 and 13, the first package has been elevated sufficiently to clear the space in front of the pusher head 113.

As the movement of the worm elevators 12 and 13 continues to elevate the packages 11, the package injector mechanism continues to deliver package after package in appropriate intervals into the gateway 54 at the bottom of the worm elevators until all of the spaces formed between successive convolutions of the ribs 17 and 27 are filled with packages. By the time the first one of the packages delivered into the gateway 54 has risen to the level of the uppermost feed ramp and at an instant when the superposed packages are horizontally aligned with the superposed feed ramps, the described Geneva system establishes engagement of the single revolution clutch 64 in a manner previously explained in detail, which causes the gate bars 47 and 53 to swing 120° around the worm elevators 12 and 13, respectively, in the direction of movement thereof. Thus, the gate bars 47a and 53a, against which the packages 11 accumulated, move laterally out of the way of said superposed packages and the next gate bars in succession, that is, bars 47b and 53b, actually push said superposed packages from behind onto the adjacent feed ramps 19, as best shown in Fig. 7, and take up the positions formerly occupied by the gate bars 47a and 53a, respectively. When the gate bars 47b and 53b advance in this manner another package 11, delivered into the gateway 54 by the continued operation of the package injector mechanism 110, follows directly behind, as likewise shown in Fig. 7, initiating a new cycle in the operation of the worm elevators.

As previously explained, the advance of the conveyor in the interior of the freezing apparatus and the transfer phase in the operative cycle of the worm elevator mechanism are so timed relative to one another that the described operation of the gate bars 47 and 53 delivers each of the packages directly in front of a conveyor arm 10 which engages behind the package and moves it along the arcuate feed ramp 19 against an outer rim 171 thereof (Figs. 6 and 7) that guides it into the feed opening of a freezing compartment (not shown).

In addition, the operational speed of the worm elevator mechanism including the package injector and transfer mechanisms is so adjusted relative to the advance of the conveyor arms 10 that another full stack of superposed packages has been built up against the gate bars 47 and 53 and is about to be transferred onto the feed ramps 19 by the time the first batch of packages has been moved out of the way and the next column of conveyor arms 10 approaches the space in front of the gateway 54. Thus, all the spaces between successive conveyor arms are supplied with packages so that the freezing compartments are gradually filled with continuous processions of slowly moving closely adjacent packages, and the capacity of the freezing apparatus is exploited to the fullest degree.

After a conveyor arm 10 has moved a package all the way through a freezing compartment, it delivers said package onto the straight discharge ramp 141 thereof and against the clockwise edge of a transfer arm 167 of the package lowering mechanism (Fig. 6). Each of the discharge ramps 141 may be provided with an inner rim 172 to dependably retain the packages on the discharge ramps as the conveyor arms 10 swing laterally away therefrom in the direction of the feed ramps 19, as shown in Figs. 6 and 7.

Since both the gate mechanism 47, 53 and the package transfer arms 167, are actuated by the single revolution clutch 64 which is intermittently engaged at intervals determined by operation of a Geneva system, as previously described, said package transfer arms 167 are rocked in clockwise direction to remove stacks of packages from the freezing apparatus at about the same time and at identical intervals as the gate mechanism delivers new stacks of packages onto the feed ramps and into the process of the freezing apparatus; and since the operation of the gate mechanism is properly related to the advance of the conveyor arms 10, as previously explained, the operation of the transfer or ejector arms, if positioned at a proper point along the discharge ramps, is automatically related in an appropriate manner to the advance of the pusher arms 10.

Thus, whenever a stack of packages has fully emerged from the end of the freezing compartments, the ejector arms 167 are rocked in clockwise direction (Fig. 7) transferring the packages from the ramps onto the rotating helical rib 143 which carries them against the stop lip 156 of the arcuate fender 155. Here they are lowered through the continued rotation of the helical rib until they drop individually from the bottom of the lowering mechanism onto the conveyor belt 157 which carries them in a single file line to whatever their next processing station may be.

While we have explained our invention with the aid of an exemplary embodiment thereof, it will be understood that we do not wish to be limited to the constructional details shown and described which may be departed from without departing from the scope and spirit of our invention. Thus, the feed mechanism of the invention may be so arranged that the stack of superposed containers is accumulated from the top to the bottom of the machine to be serviced instead of being built up from the bottom thereof. Similarly the package discharge mechanism may be arranged to lift the individual packages of a discharged stack to a common level at or above the level of the uppermost ramp, instead of lowering the individual packages to the level of a conveyor belt disposed below the said stack. Furthermore, it will be understood that the usefulness of the disclosed feed and discharge mechanisms is not limited to freezing apparatus of the type referred to herein but may be employed to service any type of container handling machine which comprises a plurality of processing lanes.

Moreover, those skilled in the art will have no difficulty in converting the described feed mechanism into a discharge mechanism or vice versa in employing the described discharge mechanism as a feed mechanism.

Having thus described our invention, what we claim as new and desire to protect by Letters Patent is:

1. A container handling mechanism comprising screw means for translating a single file of progressing containers into a procession of superposed containers travelling at right angles to said single file, means mounted in a position adjacent to said screw means for blocking the progress of the containers fed in a single file thereto and for guiding said containers during their elevation upon said screw means to thereby form a procession of containers in superposed relation, and means mounted to actuate said blocking and guiding means in timed relation with said screw means in a manner effective to unblock the superposed containers and push them from said screw means for further progress in superposed relation.

2. A container handling mechanism comprising screw means for arranging a single file of progressing containers into a stack, means mounted to move in a path adjacent to and coaxial with said screw means, said last mentioned means being effective to normally block the progress of the containers fed in single file to said screw means and to guide said containers during the stacking thereof upon said screw means, and means mounted to actuate said blocking and guiding means in timed relation with said screw means in a manner effective to unblock the stacked containers and push them from said screw means for further progress as a stack.

3. A container feed mechanism for multiple lane container handling machines comprising screw means for arranging continuously progressing containers into a stack adjacent the lanes of the container handling machine, means mounted to move in a path adjacent to and concentric with said screw means, said last mentioned means being substantially co-extensive with said screw means and being effective to normally block the progress of the containers fed individually to said screw means and to guide said containers during the stacking thereof upon said screw means, and means mounted to intermittently actuate said blocking and guiding means in a manner effective to successively unblock a predetermined number of stacked containers and push them from said screw means for progress in stacked relation into the lanes of the container handling machine.

4. A container handling machine comprising a pair of oppositely rotating screw conveyors for receiving containers progressing in single file and for elevating the same, means mounted in position adjacent said screw conveyors for blocking the progress of the containers fed in single file thereto and for guiding said containers during their elevation by said screw conveyors, and means mounted to actuate said blocking and guiding means in timed relation with said screw conveyors in a manner effective to unblock the elevated containers and push them from said screw conveyors for further progress as a group.

5. A transfer mechanism for containers comprising a pair of oppositely threaded worm conveyors mounted in spaced parallel relation and adapted to rotate in opposite directions, an abutment mounted in a position adjacent one of said worm conveyors for blocking the passage formed by and between said worm conveyors, said abutment being adapted to block the progress of containers fed individually to the worm conveyors and to guide said containers during their elevation by said worm conveyors to form a series of superposed containers thereon, and means mounted to actuate said abutment in timed relation with said worm conveyors to unblock said passage whereby said series of superposed containers are successively freed from said abutment for further progress in superposed relation from said worm conveyors.

6. A transfer mechanism for containers comprising a pair of oppositely threaded worm conveyors mounted in spaced parallel relation and adapted to rotate in opposite directions, means mounted in a position adjacent the diverging segments of said worm conveyors and effective to normally block the passage formed by and between said worm conveyors, said means being adapted to block the progress of containers individually fed to said worm conveyors and to guide said containers during their elevation by said worm conveyors to form a series of superposed containers thereon, and means mounted to actuate said passage blocking means in timed relation with said worm conveyors to unblock said passage whereby said series of superposed containers are freed for further progress in superposed relation away from said worm conveyors, said passage blocking means finally coming to rest in a passage blocking position for the formation of the next series of superposed containers.

7. A transfer mechanism for containers comprising a pair of oppositely threaded worm conveyors mounted in parallel relation, means mounted for rotating said worm conveyors at equal speed in opposite directions, means mounted for feeding individual containers into the passage formed by and between said worm conveyors for advance thereby in a path parallel to the axes thereof, means mounted in a position adjacent the divergent segments of said worm conveyors and effective to normally block said passage to restrain the containers therein and guide same in aligned relation during their advance by said worm conveyors, and means mounted to actuate said passage blocking means in timed relation with the rotation of said worm conveyors to unblock said passage and push a predetermined number of aligned containers from said worm conveyors for further progress in aligned relation, said passage blocking means finally coming to rest in a passage blocking position for the formation of the next predetermined number of aligned containers to be ejected from said transfer mechanism.

8. A transfer mechanism for containers comprising a pair of oppositely threaded worm conveyors disposed in parallel spaced relation relative to each other, means for continuously turning said conveyors in opposite directions, a number of bars arranged around at least one of said conveyors extending parallel to the longitudinal axis thereof, one of said bars being disposed within the passage formed by and between said rotating conveyors at a point adjacent diverging segments thereof, and means for moving said bars at predetermined intervals around their respective conveyor in the direction of movement thereof.

9. A transfer mechanism for containers comprising a pair of oppositely threaded worm conveyors disposed side by side and parallel to each other, means for continuously turning said conveyors at equal speed in opposite directions, a set of bars extending parallel to, and arranged around each of said conveyors, one bar of each set being disposed within the passage formed by and between said conveyors at points adjacent to diverging segments thereof, and means operating in timed relation with the rotation of said conveyors for turning said bars at predetermined intervals around their respective conveyors in the direction of movement thereof.

10. Arrangement according to claim 9 wherein each conveyor is provided with three of said bars spaced equal angular distances apart and arranged to advance in unison at periodic intervals over angles of 120°.

11. A transfer mechanism for containers comprising a pair of adjacently positioned radially spaced parallel worm conveyors having oppositely convoluted helical ribs symmetrically arranged with opposing rib portions disposed at common levels, means for continuously turning said conveyors in opposite directions, a number of bars extending parallel to and arranged around each of said conveyors with at least one of said bars disposed within the passage formed by and between said conveyors, and means operating in timed relation with the rotation of said conveyors for moving said bars at predetermined intervals in the direction of rotation of their respective conveyors.

12. A transfer mechanism for containers, comprising a pair of adjacently positioned vertical worm conveyors, each having a cylindrical core and a helical rib, said ribs being arranged around their respective cores in a symmetrically opposite manner with their confronting segments adjusted to common horizontal levels, means for continuously turning said conveyors in opposite directions, vertical bars arranged around each of said conveyors with a first bar disposed within the passage formed between said cores at points adjacent diverging segments of said ribs, and means for moving said bars at predetermined intervals in the direction of rotation of their respective conveyors to positions wherein successive bars occupy the positions previously held by said first bars.

13. A transfer mechanism for containers, comprising a pair of adjacently positioned vertical worm conveyors, each having a cylindrical core and a helical rib, said ribs being arranged around their respective cores in a symmetrically opposite manner with their confronting segments adjusted to common horizontal levels, means for continuously turning said conveyors in opposite directions, sets of vertical bars arranged around each of said conveyors equal angular intervals apart, with one bar of each set disposed within the passage formed between said cores at points adjacent diverging segments of said ribs, and means operating in timed relation with the rotation of said conveyors for turning said sets intermittently in the direction of rotation of their respective conveyors over arcs corresponding to the angular distance between successive ones of said bars.

14. A transfer mechanism for containers comprising a pair of adjacently positioned vertical worm conveyors, each having a cylindrical core and a helical rib, said ribs being arranged around their respective cores in a symmetrically opposite manner with their confronting segments adjusted to common horizontal levels, means for continuously turning said conveyors in opposite directions, sets of vertical bars arranged around each of said conveyors equal angular distances apart, with one bar of each set disposed within the passage formed between said cores at points adjacent to diverging segments of the ribs thereof, and means operable incident to the completion of a predetermined number of revolutions of said conveyors, for moving said sets around their respective conveyors over arcs corresponding to the angular distance between successive ones of said bars.

15. Arrangement according to claim 14 wherein said last mentioned means comprises a single revolution clutch and a Geneva transmission driven by one of said worm conveyors and adapted to cause brief engagement of said clutch incident of completion of a predetermined number of revolutions by said worm conveyors.

16. A transfer mechanism for containers comprising a pair of adjacently positioned vertical worm elevators, each having a cylindrical core and a helical rib, said ribs being arranged to ascend their respective cores in a symmetrically opposite manner with their confronting segments adjusted to common horizontal levels, means for continuously turning said conveyors in directions opposite to the directions of ascent of their helical ribs, sets of vertical bars arranged around each of said conveyors equal angular distances apart, with one bar of each set disposed within the passage formed between said cores at points adjacent diverging segments of the ribs thereof, means operable incident to the completion of a predetermined number of revolutions by said conveyors for moving said bars in unison around their respective conveyors in the direction of movement thereof over arcs corresponding to the angular distance between successive bars, and an injector mechanism disposed in front of the converging segments of said conveyors adjacent to the bottom ends thereof, said injector mechanism being arranged to deliver containers individually into said passage at intervals corresponding to a full revolution of said conveyors.

17. Mechanism for transferring containers from a single file supply line to a plurality of superposed processing lanes, comprising a pair of vertically positioned worm elevators spaced horizontally apart to form a passage, each of said elevators being composed of a vertical shaft, a cylindrical core firmly mounted upon said shaft and a helical rib, said ribs ascending their respective cores in a symmetrically opposite manner with their confronting segments adjusted to common horizontal levels, means for continuously turning said shafts at identical speed in directions opposite to the ascent of their respective ribs, intermeshing gears loosely mounted upon said shafts above and below said cores, respectively, a sequence of vertical bars disposed around each of said elevators and supported by said gears in positions in which a first bar of each sequence obstructs said passage at a point adjacent to the diverging segments of said cores, means for delivering containers individually into said passage disposed in front of the converging segments of said cores near the bottom of said elevators, and means controlled by the rotation of said elevators for turning said gears in the direction of movement of their respective elevators upon completion of a predetermined number of revolutions thereof over an angle of such size as to move said first bars out of said passage, while advancing successive bars into the positions formerly occupied by said first bars.

18. A container stacker and feeder comprising a pair of axially upright screw elevators spaced laterally apart to form a passage, each of said elevators including a helical rib, means for turning said elevators at corresponding speeds, means for introducing containers in single file to the inter-rib spaces of said passage for advance along said passage on said ribs, and means mounted in a position adjacent said screw elevations and effective for normally blocking said passage to thereby block the progress of containers individually fed to said screw elevators and to guide same during their advance by said screw elevators to form a series of superposed containers, and means for actuating said passage blocking means in timed relation with the rotation of said screw elevators to unblock said passage and push said series of superposed containers from said screw elevators for further progress in superposed relation, said passage blocking means finally coming to rest in a new passage blocking position to form the next series of superposed containers.

19. A container stacker and feeder comprising a pair of axially upright worm elevators spaced laterally apart to form a passage, each of said elevators including a helical rib, means for turning said elevators at corresponding speeds, means for introducing containers in single file to the inter-rib spaces of said passage for advance along said passage on said ribs, means mounted to intermittently rotate in a path concentric to the axis of at least one of said worm elevators and effective to normally block said passage to arrest the progress of the containers individually fed to said worm elevators and to guide same during their upward advance movement by the worm elevators to form a series of superposed containers thereon, and means mounted to intermittently actuate said passage blocking means to unblock said passage and push said series of superposed containers from said worm elevators for further progress in superposed relation, said passage blocking means finally coming to rest in a new passage blocking position to form the next series of superposed containers.

20. A container handling mechanism comprising a plurality of equally spaced vertically superposed container tracks, a pair of axially upright screw elevators mounted adjacent said tracks, each of said elevators including a helical rib having a pitch corresponding to the spacing of said tracks, said elevators being positioned and spaced laterally apart to form a passage adjacent said tracks, means for rotating said elevators, means for introducing containers in single file to the inter-rib spaces of said passage for advance along said passage on said ribs, means mounted intermediate said superposed container tracks and said screw elevators and effective to normally block said passage to retain the containers therein and guide the advancing containers therealong into alignment with successive container tracks, and means mounted to actuate said passage blocking means in timed relation with the rotation of said screw elevators to unblock said passage whereby a predetermined number of containers are freed for progress from said screw elevators onto the container tracks with which they are respectively aligned, said passage blocking means finally coming to rest in a new passage blocking position for assembly of the next predetermined number of containers to be ejected from said container handling mechanism.

JOHN BOYCE.
JOHN C. OLSEN.

References Cited in the file of this patent

UNITED STATES PATENTS

| Number | Name | Date |
|---|---|---|
| 1,200,244 | Sears | Oct. 3, 1916 |
| 1,247,045 | Wegner et al. | Nov. 20, 1917 |
| 1,308,208 | Troyer | July 1, 1919 |
| 1,559,615 | Hoepner | Nov. 3, 1925 |
| 1,768,482 | Koch | June 24, 1930 |
| 1,779,210 | Davis | Oct. 21, 1930 |
| 2,135,778 | Wyland | Nov. 8, 1938 |
| 2,395,511 | Simpson | Feb. 26, 1946 |
| 2,417,753 | Hesson | Mar. 18, 1947 |

FOREIGN PATENTS

| Number | Country | Date |
|---|---|---|
| 704,938 | France | Mar. 2, 1931 |